Patented Jan. 7, 1947

2,413,755

UNITED STATES PATENT OFFICE 2,413,755

CONDENSATION PRODUCT OF AMMELINES WITH ALKYLENE OXIDES

Walter P. Ericks, Buffalo, N. Y., assignor to American Cyanamid Company, New York, N. Y., a corporation of Maine No Drawing. Original application January 17, 1941, Serial No. 374,834. Divided and this application December 24, 1943, Serial No. 515,610

6 Claims. (Cl. 260—2)

This invention relates to the preparation of new and useful reaction products of triazines and substituted triazines with alkylene oxides.

More particularly, it embraces the preparation of reaction products by reacting triazines such as ammeline and substitution and polymerization products thereof with alkylene oxides such as ethylene oxide, glycidol or compounds capable of yielding an alkylene oxide-containing substance during the condensation reaction. This case is a division of my co-pending application Ser. No. 374,834, filed January 17, 1941, now Patent No. 2,381,121.

It is an object of this invention to prepare these compounds cheaply and efficiently. A still further object is to prepare surface active materials which find use as textile and leather assistants and in the paper, lacquer, resin, cosmetic and similar industries as highly effective wetting, emulsifying and detergent agents. The products of this invention are especially useful for softening purposes as well as anti-crease and wrinkle prevention in cloth, leather, fabricoid and similar materials and are particularly valuable when used as alkali and acid resistant wetting, detergent and emulsifying agents, as well as for the resolution of emulsions such as petroleum emulsions. They also find use as mercerizing assistants. Further and more important uses are suggested in the following description.

With these objects in view and such other as may hereinafter appear, the invention consists in the novel products and processes described below and more particularly defined in the claims.

The necessary reactants are mixed together with a diluent or alternatively with a portion of a recycled liquid reaction product. The product is then obtained by evaporation of the diluent.

The compounds of this invention are prepared in general by reacting a triazine, substituted or unsubstituted with a compound containing an ethylene oxide ring. If desired the reaction is accelerated by using a temperature of 150 to 200° C. and a suitable organic or inorganic base, preferably an alkali-metal or alkaline earth metal hydroxide, such as sodium hydroxide, potassium hydroxide, and calcium hydroxide, or pyridine, and the like. Usually the reaction is exothermic and hence must be controlled as by the use of an efficient cooling device. The reaction product is then filtered off, washed and dried on a steam bath. If desired, complete condensation of the reactants is not effected. Instead, the reaction is temporarily arrested and completed only after the product, resinous or waxy or in emulsion form, is applied to a cloth and the latter heated or passed over a hot roller. In place of an alkylene oxide containing compound, an epihalogenhydrin may be used, or a similar substance which has an alkylene oxide group or a group which under the conditions of the reaction forms an intermediate having an alkylene oxide group.

The following examples illustrate the invention in more detail:

Example I 12.7 g. of ammeline (0.1 mol.) was dissolved in 50 cc. of water containing 4.2 g. of sodium hydroxide of 96% strength. This solution was heated under reflux to a boiling temperature whereupon external heating was discontinued and 22.2 g. of glycidol was added at such a rate that the solution was held in its boiling state. After all the glycidol had been added the solution was refluxed for an additional 15 minutes. The addition of a neutralizing agent yielded a resinous precipitate. The product was isolated and could be easily dissolved in mildly alkaline aqueous solutions. Cotton cloth impregnated with this solution and then cured in the presence of acetic acid vapors gave a durable finish.

Example II

In another experiment, 12.7 g. of ammeline (0.1 mol.) and 22.7 g. of glycidol (0.3 mol.) were heated with stirring to 140° C. whereupon a sudden exothermic reaction caused the temperature to rise to 210° C. Cooling the mass, yielded a soft amber-colored transparent resin which was sparingly soluble in hot water.

In addition to ethylene oxide and glycidol, various other ethylene oxide ring compounds may be used, namely propylene oxide, isobutylene oxide, tetramethylene oxide, n-hexyl-ethylene oxide; epichlorhydrin, and similar and corresponding compounds having a reactive ethylene oxide ring present as well as compounds such as ethylene chlorohydrin and chloroglycerol which are capable of forming an ethylene oxide ring under the conditions of the reaction. Various alkylene oxides or alkylene oxide containing compounds may be used. However, if the compound chosen for the reaction with a triazine has a low boiling point, i. e., ethylene oxide, propylene oxide, and the like, it is advantageous to carry out the reaction in a closed system and under elevated pressure in order to raise the temperature of the reaction to a point at which the reaction proceeds at a sufficiently rapid rate to make the process commercially feasible.

These reaction products of compounds containing an ethylene oxide ring and a triazine or a substituted triazine are of particular utility in the formation of surface-active agents of the cation-active type. For this reason they are well suited for wetting and softening wool, cotton, cellulose acetate, cellulose nitrate, viscose and similar materials. They are also useful in the emulsification of mineral oils, glycerides, fats, oils and the like. They find application in the formulation of printing inks, dye pastes, dye baths, leather preparations and flotation agents. By their use it is possible to secure fullness, resistance to unraveling, and increased wet strength in rayons and other fabrics. They reduce the tendency of treated cloth materials to wrinkle or crease.

These products, particularly those having waxy or paste-like properties are useful assistants in the textile, leather, paper, rubber, lacquer and similar industries. In many of the examples, particularly when polyamines are incorporated, or when temperatures are not carefully regulated, mixtures result containing several different substances. When used as textile assistants or in leather and similar processing industries it is not necessary to isolate the desired products; instead, the mixtures can be used directly.

The products described herein may be further reacted with an amine, either primary or secondary, or with a fatty acid to yield highly desirable and useful surface-active compounds.

In addition to the triazines above mentioned various others may be reacted with the alkylene oxides. Among such compounds may be specifically cited the ammelines such as 4,6-N-dimethylammeline, 4,6-N-diethylammeline, monolaurylammeline or 4,6-dilaurylammeline, monostearylammeline or 4,6-distearylammeline, mono- or di-phenyl ammeline, and the like, may be reacted with ethylene oxide, glycidol and similar alkylene oxide containing compounds.

It is to be understood that the examples are merely specific embodiments and that the invention is not limited thereto, but is to be broadly construed within the scope of the appended claims.

I claim:

1. The process for the preparation of condensation products which comprises reacting ammeline with a compound containing an alkylene oxide ring.

2. The process for the preparation of condensation products which comprises reacting ammeline with a compound containing an ethylene oxide ring.

3. The condensation product of ammeline and a compound containing an alkylene oxide ring.

4. The condensation product of ammeline and a compound containing an ethylene oxide ring.

5. The condensation product of glycidol and ammeline.

6. The condensation product of glycidol and ammeline in the proportion of 3 mols to 1 mol, respectively.

WALTER P. ERICKS.